United States Patent [19]
Ichikawa et al.

[11] 3,848,162
[45] Nov. 12, 1974

[54] METHOD AND APPARATUS FOR CHARGING A SUPERCONDUCTIVE COIL

[75] Inventors: Hayao Ichikawa, Yokosuka; Shinhachi Utsunomiya, Yokohama, both of Japan

[73] Assignee: The President of the Agency of Industrial Science and Technology, Tokyo, Japan

[22] Filed: July 11, 1973

[21] Appl. No.: 378,194

[30] Foreign Application Priority Data
July 11, 1972  Japan................................. 47-68708
July 11, 1972  Japan................................. 47-68709

[52] U.S. Cl. .............................. 317/123, 321/8 CD
[51] Int. Cl. .............................................. H01f 7/18
[58] Field of Search ................... 317/123; 321/8 CD

[56] References Cited
UNITED STATES PATENTS
3,271,628  9/1966  Prior .................................... 317/123
3,356,924  12/1967  Buchhold .......................... 321/8 CD Primary Examiner—J. D. Miller
Assistant Examiner—Harry E. Moose, Jr.
Attorney, Agent, or Firm—Flynn & Frishauf

[57] ABSTRACT

A method for charging a superconductive coil in a flux pump circuit including a power source transformer, a pair of cryotrons, a pair of saturable reactors and the superconductive coil, wherein when the transformer is saturated to cause a primary voltage to be zero and a secondary current to become constant, a small opposite polarity voltage is applied to a primary winding to cause a short-circuit current to flow, and when the secondary current is reduced to be zero, the cryotron is turned OFF while the primary voltage continues to be zero during a predetermined time.

11 Claims, 10 Drawing Figures

METHOD AND APPARATUS FOR CHARGING A SUPERCONDUCTIVE COIL

BACKGROUND OF THE INVENTION

This invention relates to a method and apparatus for charging a superconductive coil.

A supply of an exciting current through a superconductive coil of a superconductive magnet is usually conducted through a lead wire. However, with the advent of large-sized magets, an excitation current of the order of several hundreds to several millions of amperes is necessary. When such a large current is introduced through a lead wire into a superconductive coil, then heat is introduced into a very low temperature reservoir into which a superconductive magnet is received, and it is difficult to keep the interior of the reservoir at a very low temperature. In an attempt to avoid such disadvantage, there has been developed a flux pump in which a small current supplied through a lead wire is cumulatively accumulated within a very low temperature reservoir and transformed into a large current. The conventional charging method utilizing such a flux pump will be explained by reference to FIG. 1.

Figure 1:
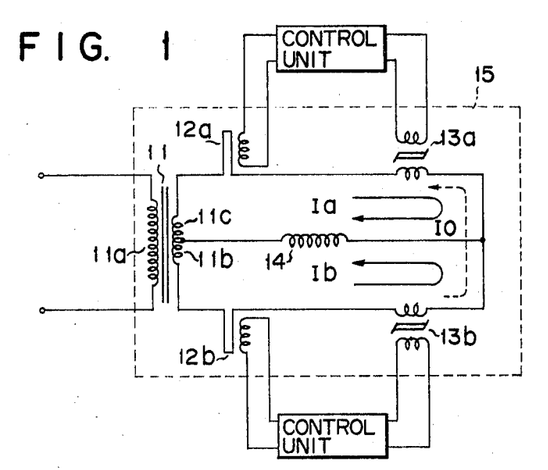
FIG. 1 is a view showing a conventional flux pump circuit for charging a superconductive coil.

A transformer 11, cryotrons 12a, 12b, saturable reactors 13a, 13b and superconductive coil 14 are received within a low temperature reservoir 15. One end of a secondary winding 11b of the transformer 11 is connected through the series-arranged cryotron 12a and saturable reactor 13a to one end of a superconductive coil 14. Likewise, the other end of the secondary winding is connected through the series-connected cryotron 12b and saturable reactor 13b to said one end of the superconductive coil 14. The other end of the superconductive coil is connected to a mid-point 11c of the primary winding.

The magnet coil is charged as follows.

When a rectangular wave alternating current E is applied to a primary winding 11a of the transformer 11, the cryotron 12a is in a superconductive state, i.e., in the ON state and the cryotron 12b is in the resistive state, i.e., in the OFF state. The application of the alternating voltage causes an electromotive force e to be generated at the secondary winding to permit an electric current $I_a$ to flow in a direction as indicated by arrows in FIG. 1, and the magnet coil 14 is charged. The electric current $I_a$ is increased at a given rate until the iron core of the transformer 11 is saturated. When the iron core is saturated, the primary and secondary voltages become zero and an increase of electric current is stopped. However, a given electric current continues to flow through a first circuit consisting of the cryotron 12a, saturable reactor 13a and superconductive coil 14. When the voltage is reduced to be zero, the cryotron 12b is turned ON under a control current from the saturable reactor 13a and the primary voltage is switched to an opposite polarity. At this time, the cryotrons 12a and 12b are both in the ON state and a short-circuit current $I_o$ begins to flow in a direction indicated by a broken line, to the secondary winding 11b of the transformer 11. The short-circuit current $I_o$ flows in a direction opposite to the electric current $I_a$ flowing through cryotron 12a and saturable reactor 13a, and is gradually increased so that the short-circuit current $I_o$ and the electric current cancel each other. At the time when the short-circuit current $I_o$ and the electric current $I_a$ become zero, the cryotron 12a is turned off. At this time, the electric current $I_a$ through the first circuit is shifted to a second circuit and cumulatively added to a current $I_b$ which flows through the second circuit. The current $I_a + I_b$ flows through superconductive coil 14 to cause it to be charged. When the primary voltage is reduced to zero, the cryotron 12a is turned ON and the primary voltage becomes an opposite polarity voltage. Thus, the above-mentioned operations are repeated so that an electric current through the superconductive coil is cumulatively added and it is increased to a desired magnitude of current.

In the above-mentioned charging method, however, a time lag of the order to 0.1 – 0.2 sec. exists from the receipt of a control signal from the saturable reactors 13a, 13b until the time when the cryotrons 12a, 12b are completely turned OFF. Even during the time lag period, a short-circuit current is increased and, when the cryotron is turned OFF, an increased large current is cut off. Therefore, a "quenching" phenomenon occurs. This presents an obstacle in the flux pump operation.

Accordingly, the main object of this invention is to provide a method and apparatus for charging a superconductive coil in which an increase in short-circuit current is suitably restricted and occurrence of a "quenching" phenomenon is decreased.

SUMMARY OF THE INVENTION

Accordingly, the present invention provides a method and apparatus for charging a superconductive coil, in which, in a flux pump circuit comprising a transformer, cryotrons, saturable reactors and a superconductive coil, means are provided for operating cryotrons after a primary voltage of the transformer is reduced to zero or a desired value in response to a control signal from the reactor.

BRIEF DESCRIPTION OF THE DRAWINGS

FGI. 9 is a circuit of a set voltage section of FIG. 6; and

DETAILED DESCRIPTION OF THE INVENTION

Figure 2:
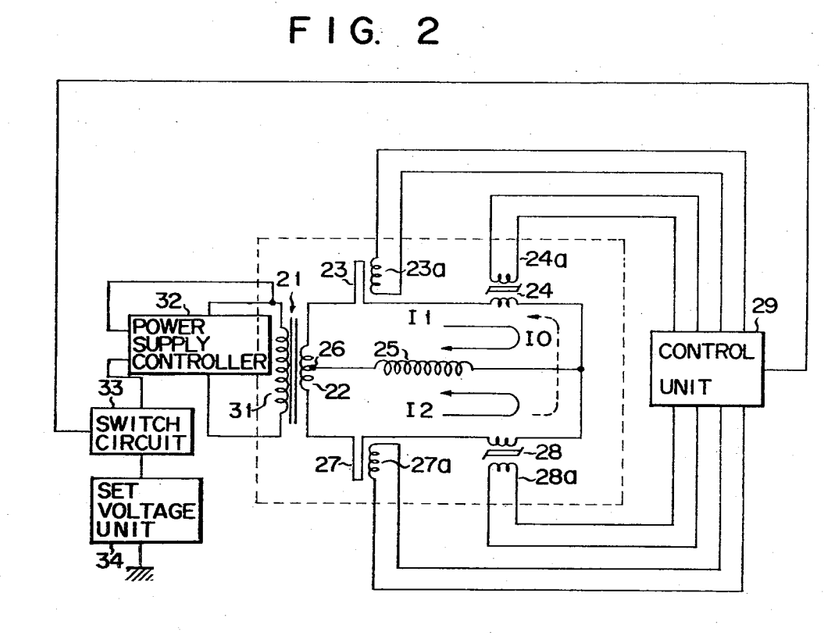
FIG. 2 is a circuit arrangement for charging a superconductive coil according to this invention.

Referring to FIG. 2, one terminal of a secondary winding 22 of a transformer 21 is connected through a control switch, a cryotron 23 for example, and a saturable reactor 24 to one terminal of a superconductive coil 25. The other terminal of the superconductive coil 25 is connected to a mid-point 26 of the secondary winding 22 of a transformer. The other terminal of the secondary winding 22 is connected through a cryotron 27 and a saturable reactor 28 to the other terminal of the superconductive coil 25. Control coils 23a and 27a of the cryotrons 23 and 27, as well as secondary coils 24a and 28a of the saturable reactors 24 and 28, are connected to a control unit 29. The control unit 29 includes a logical circuit section and a cryotron control circuit section (not shown). A primary winding 31 of the transformer is connected to the output terminal of a power supply controller 32. The input terminal of the power supply controller 32 is connected to one terminal of the primary winding 31 of the transformer 21. The other input terminal of the power supply controller is connected to a reference voltage device 34 through an electron switch 33 adopted to be operated in response to a control current from the control unit 29. The other terminal of the reference voltage setting unit is grounded.

Let us now explain the operation of a charger for a superelectroconductive coil.

Figure 3:
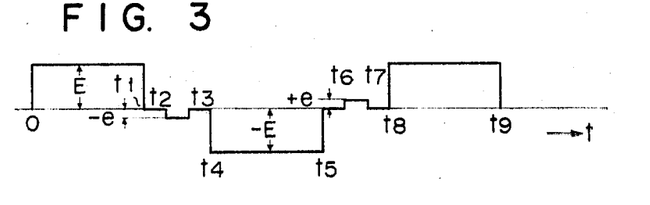
FIG. 3 is a wave-form representation of a voltage applied to a primary winding of the flux pump circuit of FIG. 2.

When the cryotron 23 is turned ON and the cryotron 27 is turned OFF, a voltage E is applied, at the time 0, to the primary winding 31 of the transformer 21 as shown in FIG. 3. The voltage E causes an electromotive force to be induced at the secondary winding 22 to permit electric current $I_1$ to gradually increasingly be flowed through a first circuit of cryotron 23, saturable reactor 24 and the superconductive coil 25. The electric current $I_1$ becomes constant, i.e., $_1$, when the iron core of the transformer is saturated and the primary and secondary winding voltages reduce to be zero. At this time the cryotron 27 is turned ON and the switch 33 is operated to cause the voltage of the primary winding to be reduced to zero at the time period $t_1 - t_2$. The time period $t_1 - t_2$ is determined by the time period in which the cryotron 27 is completely turned ON. During the time period $t_2 - t_3$ a small negative voltage $-e$ is supplied to the primary winding 31 and, since the cryotrons 23 and 27 are both in the ON state, a short-circuit current $I_0$ flows from the secondary winding 22 of the transformer through cryotron 27, saturable reactors 28, 24 to the cryotron 23 as shown in a direction as indicated by arrows in FIG. 2. Since the short circuit current $I_0$ is selected to be a small value, a rapid increase in short-circuit current is prevented. The short-circuit current $I_0$ is gradually increased and, once it balances with a current $I_1$ which flows through the first circuit, no flow of current through the first circuit occurs. At this time i.e. $t_3$, the cryotron 23 is controlled to be turned OFF by a control current from the control unit. During the time period $t_3 - t_4$ in which the cryotron 23 is completely turned OFF, a primary voltage is caused to be zero. Only during the time period $t_3 - t_4$ a short-circuit current is rendered constant, as the primary voltage is reduced to zero as mentioned above. The current $I_1$ of the first circuit is maintained at zero until the cryotron 23 is completely turned OFF. Thus, a "quenching" phenomenon can be avoided. When the first circuit is opened, the current $I_1$ is shifted to a second circuit and flows through the superconductive coil 25. During the time period $t_4 - t_5$ the voltage of the primary winding becomes a negative voltage $-E$ and a current $I_2$ flows through the second current. The current $I_2$ is cumulatively added to the current $I_1$ and flows through the superconductive coil 25. Like the first circuit, the transformer 21 is saturated and the primary voltage becomes zero while the current $I_2$ is rendered constant. Then the cryotron 23 is again turned ON. During the time period $t_5 - t_6$ in which the cryotron 23 is completely turned ON, the primary voltage becomes zero. During the time period $t_6 - t_7$ a small positive voltage $+e$ is selected as the primary voltage. During the time period $t_7 - t_8$, the primary voltage becomes zero, the cryotron 27 is turned OFF and a current $I_1 + I_2$ flowing through the second circuit is shifted to the first circuit. In this way, the current is cumulatively added and a desired magnitude of electric current is caused to flow through the superconductive coil 25.

With the above-mentioned embodiment, a zero control of a primary voltage is effected by setting a voltage of the set voltage device 34 to be zero. However, even if the voltage of the set voltage device is set to be zero, the primary voltage does not completely become zero in actual practice. Therefore, the following control circuit is adopted.

Figure 4:
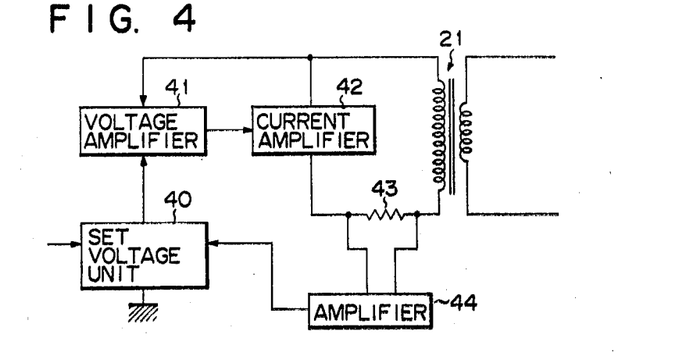
FIG. 4 is a view showing a modified control circuit for controlling a primary voltage of a flux pump of FIG. 2.

As shown in FIG. 4, a set voltage circuit 40 has one end grounded and is further connected to the input of a voltage amplifier 41. The output of the voltage amplifier 41 is connected to a current amplification circuit 42. One output of the current amplification circuit 42 is connected through a reference resistor 43 to one end of a primary winding 31 of a transformer and the other output of the current amplification circuit 42 is connected to the other end of the primary winding 31. The other end of the primary winding 31 is connected to the input terminal fo the voltage amplifier 41. Both terminals of the reference resistor 43 are connected to the input of a voltage amplifier 44 whose output terminal is connected to the set voltage circuit 40. The set voltage circuit 40 includes, as ashown in FIG. 5, fieldeffect transistors 45 – 48, DC power sources 49 – 52 and amplifiers 53 – 56. The outputs of the amplifiers 53 – 56 are connected to the gates of the field-effect transistors 45 – 48, respectively. The source electrodes of the transistors 45 – 48 are connected to respective ends of the DC power sources 49 – 52. The drain electrodes of the transistors are grounded. The other ends of the DC power sources 49 – 52 are connected in common to amplifiers 41 and 44, and are grounded through a resistor 57.

Figure 5:
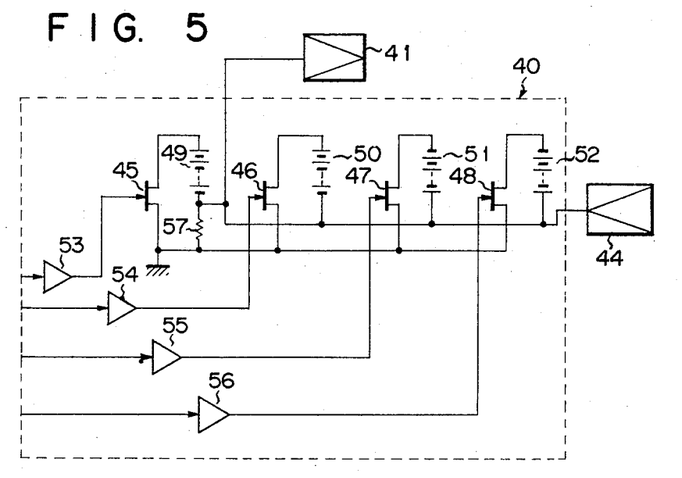
FIG. 5 is a view showing a set voltage circuit of the control circuit of FIG. 4.

Suppose that, with the above-mentioned voltage control circuit, a set voltage $e$ of the set voltage circuit 40 is zero and a voltage of the primary winding 31 is $e_{10}$. Then, it is necessary to adjust the output voltage of the set voltage circuit 40 in an attempt to cancel the voltage $e_{10}$. This adjustment is made by suitably amplifying a value corresponding to a drop-down voltage across the reference resistor 43 using the amplifier 44, and applying the amplified voltage to the set voltage circuit 40 in which a predetermined voltage is determined.

Let us suppose that a voltage to be corrected is represented by $e_{10}$; the reference resistor 43 by R; and an electric current flowing through the resistor 43 by $I_{10}$. Then, $e_{10} = RI_{10}$;

$\mu 3 = I_{10}/\mu_1 \mu_2$; and $\mu_3 = 1/\mu_1 \mu_2 R$.

From these expressions an amplification factor $\mu_3$ of the voltage amplifier 44 is derived. When the amplification factor $\mu_3$ is accurately determined, an electromotive force $e_{10}$ generated at the primary winding 31 during the time periods $t_1 - t_2$, $t_3 - t_4$, $t_5 - t_6$ and $t_7 - t_8$ is taken out from a value corresponding to a drop-down voltage across the reference resistor 43, and amplified by the amplification factor $\mu_3$ in the amplifier 44. The output from the amplifier 44 causes the set voltage circuit 40 to be operated, and a voltage $-e_{10}$ opposite in polarity to the electromotive force $e_{10}$ is applied to the primary winding to cause an electromotive force at the secondary winding 22 to be completely zero. If the cryotron is turned OFF during the "zero" period, no "quenching" phenomenon occurs. Suppose that in such a pump circuit a small voltage e is zero, i.e. at the times $t_3$ and $t_7$ it is necessary to effect a switching operation without any time delay. This swift switching operation is reliably carried out by a switching circuit using a field-effect transistor as shown in FIG. 5.

With the above-mentioned embodiment, a magnetization of a superconductive coil is possible. In a case of a demagnetization however, the operational procedure is entirely different. If a demagnetization is effected, then a complicated control circuit is necessary. The following is an embodiment in which magnetization and demagnetization are effected by the same procedure.

Figure 6:
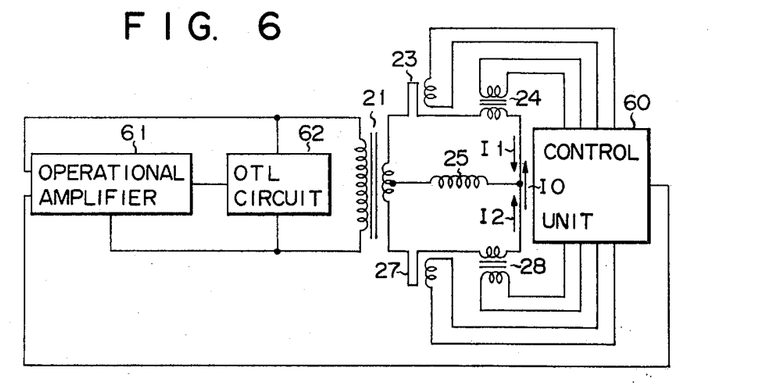
FIG. 6 is a view showing another flux pump circuit according to this invention.
Figure 7:
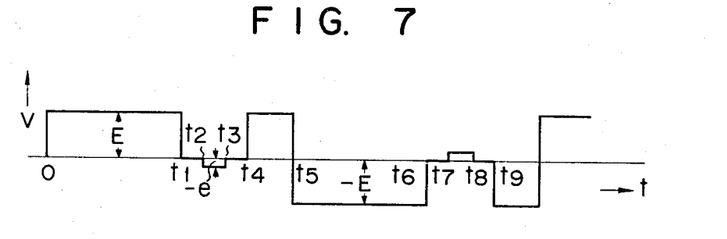
FIG. 7 shows a wave-form representation of a primary voltage of a flux pump of FIG. 6.

As shown in FIG. 6, a flux pump circuit is the same as the above-mentioned embodiment. The control circuit comprises an operational amplifier 61 connected to both ends of the primary winding 31 of a transformer 21 and coupled to the output of a control unit 60. An OTL circuit 62 is coupled to the output of the operational amplifier 61 and is further connected to the primary winding 31 of the transformer. With such a circuit arrangement, a voltage E is applied at the time 0 to the primary winding as shown in FIG. 7. The flux of the ion core of the coil is shifted from $-\Phi s$ to $+\Phi s$, and, immediately before $+\Phi s$, is attained i.e. at the time $t_1$, the primary voltage becomes zero. At the time period $t_1 - t_2$ a cryotron 23 is turned ON. During this time period the flux is maintained constant and an electric current through a secondary winding of the transformer is not varied. Therefore, an operational delay of the cryotron is covered. When at the time $t_2$ a voltage $-e$ is applied to the primary winding, a short-circuit current is caused to flow through the secondary winding. At the time $t_3$ when an electric current through the cryotron 23 becomes zero, pulses are generated from a saturated reactor 24 to cause the cryotron 23 to be turned OFF and, at the same time, the primary voltage to become zero. During the time period $t_3 - t_4$ the cryotron 23 is completely turned OFF. During the time period $t_4 - t_5$ a voltage E is applied to the primary winding and at the time $t_5$ the flux attains a value $+\Phi s$. During the time period $t_4 - t_5$ the superconductive coil begins to be excited. However, the coil is being demagnetized. At the time $t_5$ the primary voltage becomes an opposite polarity $-E$ and the flux causes magnetization of the coil by changing from $+\Phi s$ to $-\Phi s$. Immediately when $-\Phi s$ is attained, i.e. at the time $t_6$, the primary voltage becomes zero and the magnetization is stopped. In the same way as mentioned above, a current is shifted from the first circuit to the second circuit, and magnetization and demagnetization are likewise repeated. Under such control, magnetization is effected during the time period $t_o - t_1$ and demagnetization is effected during the time period $t_4 - t_5$. In this case, the net increment and decrement of the flux is decreased. However, the magnetization and demagnetization are controlled, in the same way, dependent upon the length of these periods.

Figure 8:
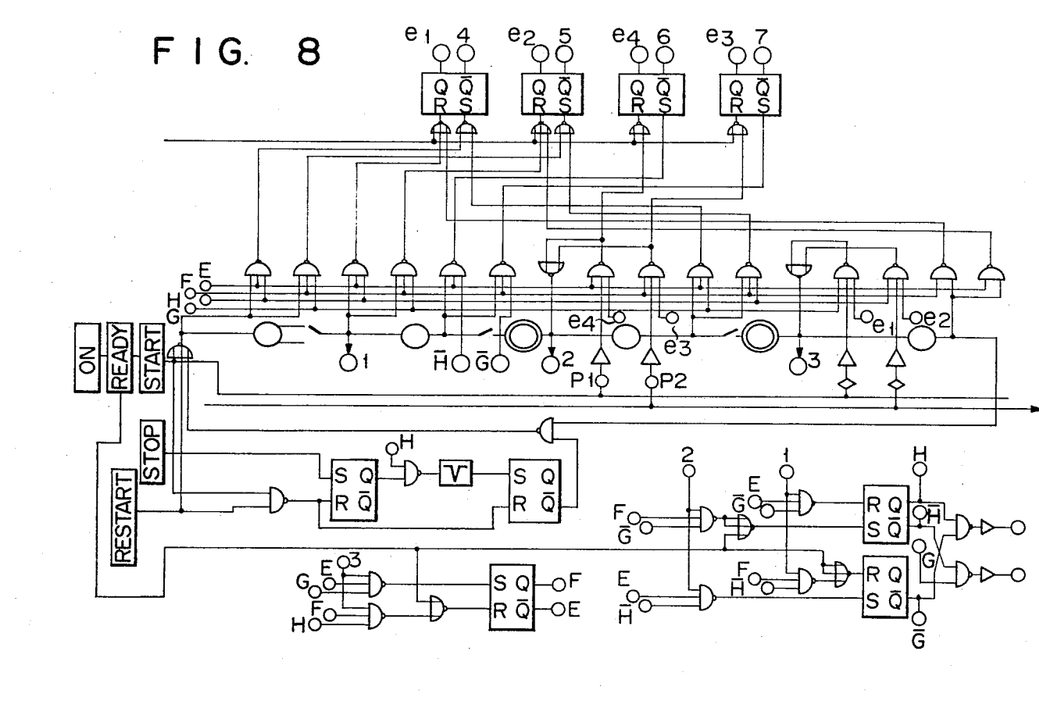
FIG. 8 is a detailed circuit of a control unit of FIG. 6.
Figure 9:
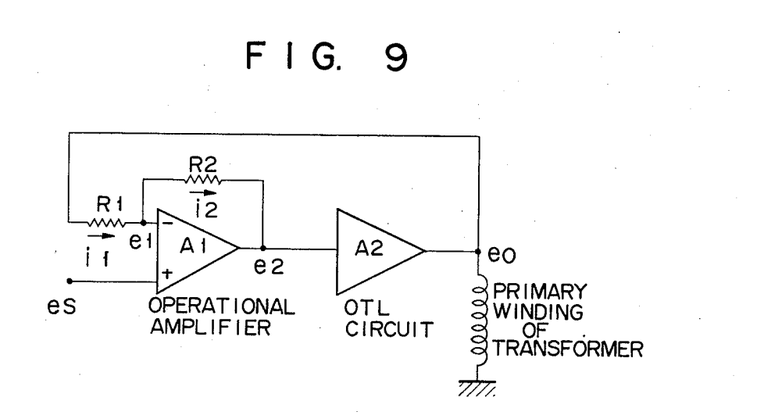
Figure 10:
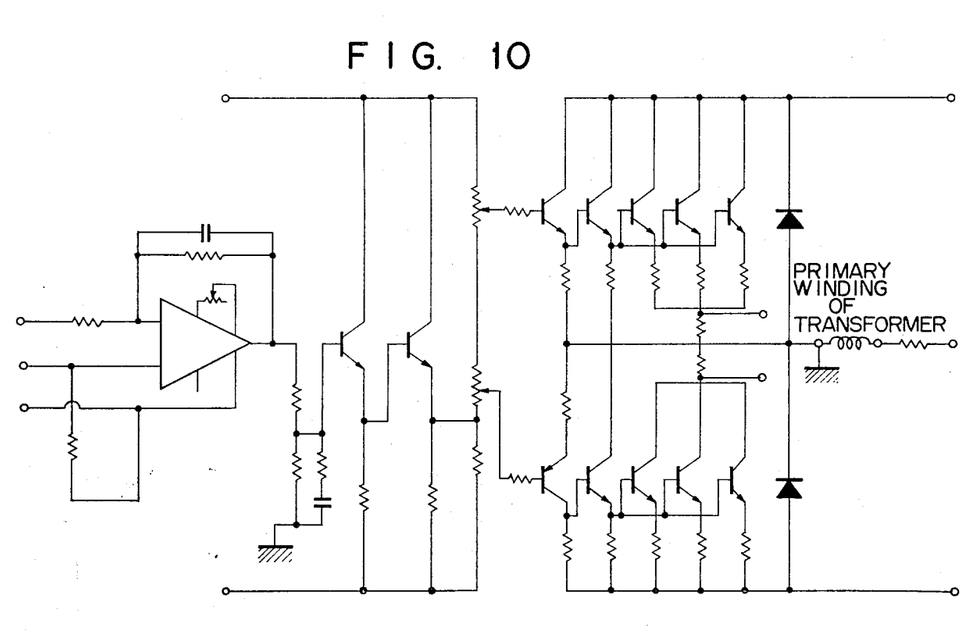
FIG. 10 is a detailed circuit arrangement of an OTL circuit of FIG. 6.

The control unit 60, operational amplifier 61 and OTL circuit section 62 as shown in block form are shown in detail in FIGS. 8 – 10. To explain the set voltage section as shown in FIG. 9, a set voltage is applied to an in-phase input side of the operational amplifier and at an opposite side of the operational amplifier a two-stage voltage feedback is effected. $A_1$ and $A_2$ denote the respective voltage amplification factors. Thus, $A_1 >> 1$ and $A_2 \approx 1$, and $R_1 << R_2$. Therefore, the following expression is established with respect to the circuit shown in FIG. 9.

$$\left.\begin{array}{l} i_1 = e_o - e_1/R_1 \\ i_2 = e_1 - e_2/R_2 \\ i_1 = i_2 \\ e_2 A_2 = e_o \\ (e_2 - e_1)A_1 = e_2 \end{array}\right\} \quad (1)$$

From the above expression, $$e_s = \left[\frac{1}{A_1 A_2} + \frac{\frac{1}{R_1} + \frac{1}{R_2 A_2}}{\frac{1}{R_1} + \frac{1}{R_2}}\right] e_2 \quad (2)$$

Taking the above-mentioned requirements into consideration, $$e_s \approx e_o.$$

The outstanding feature of the control method of the present invention resides in that a current control is effected by a voltage control. This control is not attained until a combination with a superconductive coil is possible. Since an ordinary coil has not only an inductance, but also a resistance, a current through the coil comes to be zero when a voltage across the coil is zero. However, a superconductive coil has an inductance only and does not possess a resistance. Therefore, when a voltage across a superconductive coil is reduced to zero, a current through the coil continues to have a value prevalent before the voltage is reduced to zero. As will be evident from the expression (2), $e_s$ is not exactly equal to $e_o$, and even if $e_s$ is reduced to zero, $e_o$ exactly comes to be zero. Though a current is somewhat changed to a smaller extent, no problem occurs when viewed from a practical viewpoint. The detailed circuit arrangement of the DTL circuit is shown in FIG. 10.

What we claim is:

1. A method for charging a superconductive coil in a flux pump circuit provided in a very low temperature atmosphere and including a power source transformer and a first and a second circuit provided on the secondary winding side of the power source transformer and each led through a respective control switch to a superconductive coil, comprising the steps of:

during one half cycle, applying a rectangular wave voltage to a primary winding of the power source transformer in such a state that a control switch of the first circuit is turned ON and a control switch of the second circuit is turned OFF;

turning ON the second circuit when the power source transformer is saturated to cause the primary winding voltage to be reduced to zero;

applying a small opposite polarity voltage to the primary winding to cause a short-circuit current opposite in direction to electric current through the first circuit to be generated;

operating the control switch of the first circuit when the current of the first circuit is reduced to be zero; and supplying zero voltage to the primary winding for a predetermined time period equal at shortest to the time necessary for the control switch to complete its operation;

the other half cycle being identical with said one half cycle except the polarity is opposite; and said steps being repeated so that charging current through the superconductive coil is cumulatively added.

2. An apparatus for charging a superconductive coil comprising:

a flux pump enclosed within a very low temperature reservoir and including a power source transformer, a superconductive coil connected at the center of a secondary winding of a power source transformer, a pair of control switches respectively connected at both the ends of secondary winding of the transformer, and a pair of saturable reactors respectively connected to the control switches;

a control unit for controllably turning ON and OFF the control switch based on the output of the saturable reactor; and a voltage control device generating voltage signals in response to the control signal of the control unit, said voltage signals including a zero voltage generated for a predetermined time period equal at shortest to the time necessary for the control switch to complete its operation at the time when the control switch is operated.

3. The apparatus according to claim 2 in which said voltage control device comprises a power supply control section coupled to the primary winding of the transformer, a switch circuit section connected to the power source section and operated in response to the control signal of the control unit; a set voltage unit connected to the switch circuit section and adapted to generate a set voltage supplied to the power source section in response to the operation of the switch circuit.

4. The apparatus according to claim 2 in which said voltage control device generates a voltage signal including a rectangular wave voltage having a predetermined amplitude, a small voltage generated subsequent to the rectangular wave voltage and having an opposite polarity to the rectangular wave voltage, and a zero voltage generated subsequent to the small voltage when the control switch is turned OFF.

5. The apparatus according to claim 2 in which said voltage control device generates a voltage signal including a first rectangular wave voltage having a predetermined amplitude, a small voltage generated subsequent to the first rectangular wave voltage and having an opposite polarity to the first rectangular wave voltage, a zero voltage generated subsequent to the small voltage when one of the control switches is turned OFF, and a second rectangular wave voltage having the same polarity as said first rectangular wave voltage.

6. The apparatus according to claim 2, in which said voltage control device includes a set voltage unit for generating a predetermined set voltage; a voltage amplifier coupled to the set voltage unit for amplifying the set voltage, and coupled to the transformer to perform a negative feedback amplification; a current amplifier having an input terminal coupled to receive the amplified set voltage and an output terminal connected to one terminal of the transformer; a reference resistor connected between the other terminal of the current amplifier and the other terminal of the transformer; and a further amplifier connected between the terminals of the reference resistor for amplifying drop-down voltage appearing across the reference resistor and having its output coupled to the set voltage unit in which the set voltage is generated.

7. The apparatus according to claim 2, in which said control switch comprises a cryotron.

8. The apparatus according to claim 2 in which said voltage control device generates a voltage signal including a rectangular wave voltage haivng a predetermined amplitude, a first zero voltage generated subsequent to the rectangular wave voltage when one of the control switches is turned ON, a small voltage generated subsequent to the first zero voltage and having an opposite polarity to the rectangular wave voltage, and a second zero voltage generated subsequent to the small voltage when the other of the control switches is turned OFF.

9. The apparatus according to claim 2 in which said voltage control device generates a voltage signal including a first rectangular wave voltage having a predetermined amplitude, a first zero voltage generated subsequent to the first rectangular wave voltage when one of the control switches is turned ON, a small voltage generated subsequent to the first zero voltage and having an opposite polarity to the first rectangular voltage, a second zero voltage generated subsequent to the small voltage when the other of the control switches is turned OFF, and a second rectangular wave voltage generated subsequent to the second zero voltage and having the same polarity as said first rectangular voltage.

10. A method for charging a supercondutive coil in a flux pump circuit provided in a very low temperature atmosphere and including a power source transformer and a first and a second circuit provided on the secondary winding side of the power source transformer and led through first and second respective control switches to the superconducitve coil, comprising steps of:

during one half cycle, applying a rectangular wave voltage to a primary winding of the power source transformer in such a state that a control switch of the first circuit is turned ON and a control switch of the second circuit is turned OFF;

turning ON the second control switch of the second circuit when the power source transformer is saturated to cause the primary winding voltage to be reduced to zero;

applying a small opposite polarity voltage to the primary winding to cause a short-circuit current opposite in direction to electric current through the first control switch to be generated;

turning OFF the first control switch when the current of the first control switch is reduced to be zero;

supplying zero voltage to the primary winding for a predetermined time period equal at shortest to the time necessary for the control switch to complete its operation;

the other half cycle being identical with said one half cycle except the polarity is opposite; and said steps being repeated so that charging current through the super conductive coil is cumulatively added.

11. A method for charging a superconductive coil in a flux pump circuit according to claim 10 further comprising the step of supplying an additional rectangular wave voltage having the same polarity and amplitude as that of said rectangular wave voltage to the primary winding after the step of supplying zero voltage to the primary winding.

* * * * *